United States Patent

[11] 3,624,111

[72] Inventor John A. Edwards
       Los Altos, Calif.
[21] Appl. No. 538,581
[22] Filed Mar. 30, 1966
[45] Patented Nov. 30, 1971
[73] Assignee Syntex Corporation
       Panama, Panama
       Continuation-in-part of application Ser. No.
       528,398, Feb. 18, 1966, now Patent No.
       3,402,173, which is a continuation-in-part
       of application Ser. No. 441,297, Mar. 19,
       1965, now abandoned. This application
       Mar. 30, 1966, Ser. No. 538,581

[54] 18-LOWER ALKYL ANDROSTENES
     11 Claims, No Drawings
[52] U.S. Cl. ................................................. 260/397.4,
       260/239.5, 260/239.55, 260/397.3, 260/397.5,
       260/999
[51] Int. Cl. ........................................................ C07c 169/22
[50] Field of Search ............................................ /Machine
       Searched Steroids

[56] References Cited
UNITED STATES PATENTS
3,311,644  3/1967  Brown et al. .................... 260/397.4
3,318,922  5/1967  Windholz et al. ............... 260/397.4

Primary Examiner—Henry A. French
Attorneys—Evelyn K. Merker, Leon Simon and Gerald A. Blaufarb ABSTRACT: 18-Lower alkyl androstenes prepared by converting 3β, 20β-dihydroxypregn-5-en-18-oic acid 18,20-lactone 3-acetate into 3β,20β-di-hydroxy-18-alkylpregn-5-en-18-one using lower alkyl magnesium halide which is converted into 18-alkylpregn-5-en-3β,20β-diol via the hydrazone followed by oxidation to afford 18-alkyl-progesterone which is converted into the enol ether and then the 17α-hydroperoxy thereof is treated with, for example, zinc in acetic acid to furnish 18-alkyl-17α-hydroxyprogesterone. This compound upon treatment with lithium tri-t-butoxyaluminum hydride followed by lead tetraacetate yields 3β-hydroxy-18-alkylandrost-4-en-17-one which can be further modified.

18-LOWER ALKYL ANDROSTENES

This is a continuation-in-part of application Ser. No. 528,398, filed Feb. 18, 1966 now U.S. Pat. No. 3,402,173, which is a continuation-in-part of application Ser. No. 441,297, filed Mar. 19, 1965, now abandoned.

The present invention relates to novel cyclopentanophenanthrene derivatives.

More particularly, the present invention relates to novel 18-lower alkyl androstenes of the following formula:

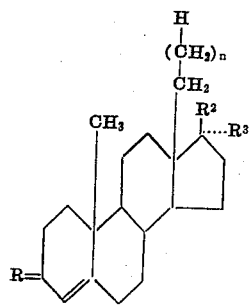

wherein R represents oxo or the group

wherein $R^4$ represents hydrogen, hydroxy, or a carboxylic acyloxy group containing less than 12 carbon atoms, preferably R is oxo, $n$ represents a positive integer of from 1 to 3, $R^2$ represents hydroxy or a carboxylic acyloxy group containing less than 12 carbon atoms, $R^3$ represents hydrogen, lower alkyl such as methyl, ethyl and the like, lower alkenyl such as vinyl, prop-1-enyl, but-1-enyl, and the like, or lower alkynyl such as ethynyl, prop-1-enyl, and the like, and $R^2$ and $R^3$ taken together represents oxo.

The carboxylic acyloxy groups of the compounds of the present invention contain less than 12 carbon atoms and may be of straight, branched, cyclic or cyclic-aliphatic chain structure. This structure may be saturated, unsaturated, or aromatic and optionally substituted by functional groups such as hydroxy, alkoxy containing up to five carbon atoms, acyloxy containing up to 12 carbon atoms, nitro amino, halogeno, and the like. Typical esters thus include acetate, propionate, enanthate, benzoate, trimethylacetate, t-butylacetate, phenoxyacetate, adamantoate, dichloroacetate, and the like.

The novel compounds of the present invention possess valuable physiological properties. The compounds of the present invention wherein $R^3$ is hydrogen or lower alkyl, for example methyl, ethyl or the like, are valuable anabolic/androgenic compounds having a favorable anabolic/androgenic ratio. The compounds of the present invention wherein $R^3$ is a lower alkynyl such as ethynyl or a lower alkenyl such as vinyl demonstrate pituitary inhibition and progestational activity and are useful in the treatment of various menstrual disorders and in the control and regulation of fertility. In addition, the novel compounds are valuable antiestrogenic agents. The compounds of the present invention wherein $R^3$ is a lower alkenyl such as vinyl also demonstrate marked anabolic activity. The compounds of the present invention may be administered in the usual pharmaceutical compositions at dosages appropriate for the condition being treated.

The compounds of the present invention are prepared according to a process which may be illustrated as follows.

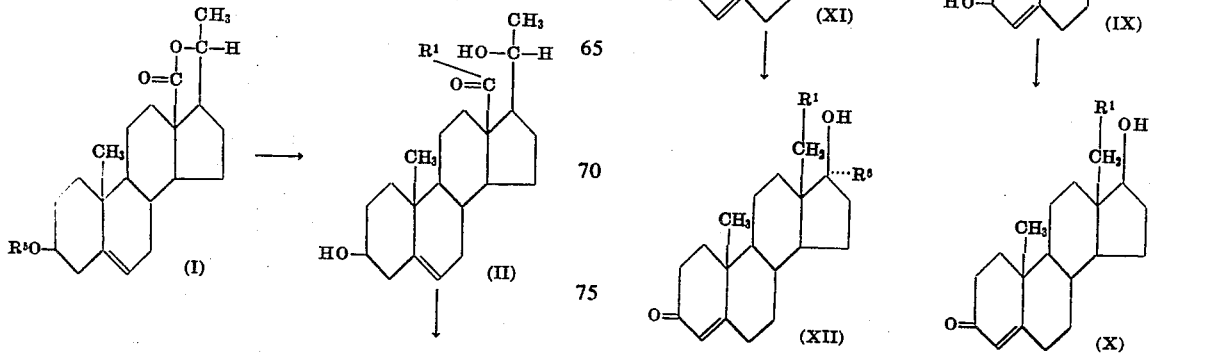

In the above formulas, R¹ represents a lower alkyl containing from one to three carbon atoms, i.e., methyl, ethyl or propyl, R⁵ represents a carboxylic acyl group containing less than 12 carbon atoms, preferably acetoxy, and R⁶ represents lower alkyl such as methyl, ethyl, and the like, lower alkenyl such as vinyl, prop-1-enyl, and the like, and lower alkynyl such as ethynyl, prop-1-ynyl, and the like.

In practicing the above illustrated process, the steroid starting material I is reacted with a molar excess, preferably from about 10 mols to about 60 mols, more preferably about 10 to 40 mols, of a lower alkyl magnesium halide per mol of steroid starting material in a suitable solvent such as the aromatic hydrocarbons, for example, benzene, toluene, xylene, or the like, either alone or in admixture with lesser amounts of inert organic solvents such as dioxane, tetrahydrofuran, or the like, at a temperature ranging from about 60° C. to about 150° C. and preferably at the reflux temperature of the solvent employed for from about 24 hours to about 72 hours or longer depending upon temperature and concentration of reactants, thus giving the 18-alkyl-18-keto steroid II. Suitable alkyl magnesium halides include the alkyl magnesium bromides, chlorides, and iodides, preferably the chlorides, wherein said alkyl contains from one to three carbon atoms, i.e. methyl, ethyl, and propyl.

The 18-alkyl-18-one steroid II is then treated with an excess of hydrazine hydrate in an alcohol or glycol solvent such as ethanol, ethylene glycol, triethylene glycol, and the like, at an elevated temperature, preferably under reflux or about 145° C. or higher, for a time sufficient, generally about 5 hours or more, to obtain the corresponding 18-alkyl-18-hydrazone which upon treatment with a strong base furnishes the corresponding 18-alkyl-20β-hydroxy steroid III. The treatment with base is preferably accomplished by adding a solution of the 18-alkyl-18-hydrazone in a solvent such as diethylene glycol to a solution of a strong base, e.g. sodium or potassium hydroxide, in an organic solvent such as diethylene glycol while maintaining the temperature of the base solution at about 215° to 240° C., preferably 225° C.

The 18-alkyl-3β,20β-diol steroid III is then subjected to Oppenauer oxidation to yield the steroid IV, 18-alkyl-progesterone.

The 18-alkyl steroid IV is converted to the enol ether as by treatment with ethyl orthoformate to furnish the steroid V which upon treatment with an alkali metal tertiary alkoxide such as potassium t-butoxide in the presence of oxygen gas affords the 17α-hydroperoxy steroid VI.

The 17α-hydroperoxy steroid VI is then converted into the 3-keto-Δ⁴-17α-hydroxy steroid VII by treatment with, for example, zinc dust in an acid medium such as acetic acid.

The 17α-hydroxy-18-alkylprogesterone steroid VII is then converted into 3β-hydroxy-18-alkylandrost-4-en-17-one (VIII) by treatment with lithium tri-t-butoxyaluminum hydride in tetrahydrofuran followed by reaction with lead tetraacetate.

The 3β-hydroxy-17-one steroid VIII may be reduced as by treatment with, e.g. lithium tri-t-butoxyaluminum hydride in tetrahydrofuran, to furnish the 3β, 17β-diol steroid IX which upon oxidation by treatment with, e.g., 2,3-dichloro-5,6-dicyano-1,4-benzoquinone in dioxane, furnishes the corresponding 3-keto steroid X.

Alternatively, the 3β-hydroxy-17-keto steroid VIII may be transformed into the 3β, 17β-diol steroid XI having a 17α-substituent such as alkyl, alkenyl or alkynyl. The 17α-alkynyl derivatives of the steroid XI (XI, R⁶ = alkynyl) may be obtained by treating the 17-keto steroid VIII with, e.g. potassium acetylide, potassium methylacetylide, and the like, in liquid ammonia. By treatment of the 17-keto steroid VIII with an alkenylmagensium halide, e.g. vinylmagnesium bromide, 1-propenylmagnesium bromide, and the like, the corresponding 3β, 17β-diol-17α-alkenyl steroid is obtained (XI, R⁶ = alkenyl). Similarly, by treatment of the 17-keto steroid VIII with, e.g. an alkylmagnesium bromide such as methylmagnesium bromide in ether, there are obtained the corresponding 3β, 17β-diol-17α-alkyl compounds (XI, R⁶ = alkyl).

The 3β, 17β-diol steroid XI may be transformed into the corresponding 3-keto steroid XII by treatment with, e.g., 2,3-dichloro-5,6-dicyano-1,4-benzoquinone in tetrahydrofuran, dioxane, and the like.

The thus-obtained 3-keto steroids (X and XII) may be transformed into the corresponding 3-desoxy derivatives by thioketalization followed by desulfurization with Raney nickel or sodium in liquid ammonia.

The compounds of the present invention containing a free hydroxyl may be esterified and etherified in the conventional manner. Thus, the free hydroxyl containing compounds may be esterified as through the use of carboxylic acid anhydride and p-toluenesulfonic acid in acid or etherified through the use of dihydropyran or dihydrofuran and an acid catalyst.

The following detailed examples are presented to illustrate the present invention, but not as a limitation thereof.

EXAMPLE 1

A mixture of 28 g. of 3β, 20β-dihydroxypregn-5-en-18-oic acid 18,20-lactone-3-acetate and 700 ml. of toluene is heated under reflux with 3N-methyl magnesium chloride in tetrahydrofuran (400 ml.) for 4 days. The reaction mixture is cooled, poured onto ice, diluted with water and extracted with ethyl acetate. The organic layer is washed with water, dried and evaporated to yield 3β, 20β-dihydroxy-18-methylpregn-5-en-18-one which may be crystallized from acetone:hexane.

A solution of 12.2 g. of 3β, 20β-dihydroxy-18-methylpregn-5-en-18-one in 400 ml. of triethylene glycol is heated under reflux at 145° C. with 80 ml. of 80 percent hydrazine hydrate and 25 g. of hydrazine dihydrochloride for 5 hours. The mixture is then allowed to cool and thereafter poured into water. The mixture is then extracted with ethyl acetate and the organic layer washed with water, dried and evaporated to dryness to yield the corresponding 18-hydrazone derivative which may be crystallized from ethyl acetate:hexane.

A solution of 20 ml. of 100 percent hydrazine hydrate in 200 ml. of diethylene glycol is distilled, under nitrogen, until the internal temperature reaches 225° C. Ten grams of potassium hydroxide is then added cautiously and distillation continued, under nitrogen, until the temperature again reaches 225° C. A solution of 15 g. of the above 18-hydrazone derivative in 150 ml. of diethylene glycol is then added slowly while maintaining the temperature of the reaction mixture at reflux at 225° C. The resulting solution is then heated under reflux in a nitrogen atmosphere for 5 hr., cooled, diluted with water and the precipitate which forms collected by filtration, washed with water and dried under vacuum to yield 18-methylpregn-5-ene-3β, 20β-diol which may be crystallized from methanol.

A solution of 2.2 g. of 18-methylpregn-5-ene-3β, 20β-diol in 50 ml. of toluene and 8 ml. of cyclohexanone is boiled until 10 ml. of distillate is collected. Three milliliters of cyclohexanone and 2 g. of aluminum isopropoxide are then added and the mixture heated at reflux for 15 min., cooled, and poured into 150 ml. of water containing 5 ml. of acetic acid. The mixture is steam-distilled to remove solvents and the resulting emulsion extracted three times with 150 ml. portions of ether. The organic layer is washed with water, 2N-hydrochloric acid and saturated sodium bicarbonate solution, dried and evaporated. The residue is dissolved in hexane:benzene (2:1) and adsorbed on alumina. Elution with benzene yields 18-methylprogesterone.

A mixture of 1 g. of 18-methylprogesterone, 10 ml. of dioxane, 1 ml. of ethyl orthoformate, and 50 mg. of p-toluenesulfonic acid in the presence of Drierite, at 25° C., is stirred for 2.5 hours. The mixture is then poured into aqueous potassium bicarbonate and extracted with ether. The ether extract is dried over sodium sulfate and evaporated in the presence of a trace of pyridine. The resulting residue is dissolved in hexane:benzene (4:1) and filtered through alumina furnishing 3-ethoxy-18-methylpregna-3,5-dien-20-one which may be crystallized from methanol containing a trace of pyridine.

A solution of 500 mg. of the above enol-ether in 5 ml. of tetrahydrofuran is added to 15 ml. of 1N-potassium t-butoxide in t-butanol and the resulting solution shaken at 0° C. under an atmosphere of oxygen. The uptake of oxygen ceases at 35 ml. after 15 minutes. The solution is then neutralized to pH-7 by 1N-acetic acid, extracted with ethyl acetate and the organic layer washed with water, dried and evaporated to dryness at 30° C. The residue is crystallized from acetone:water to yield 17α-hydro-peroxy-3-ethoxy-18-methylpregna-3,5-dien-20-one.

A mixture of 3.1 g. of the above 17α-hydroperoxy compound in 100 ml. of acetic acid is stirred with 6 g. of zinc dust at 25° C. for 12 hours. The mixture is then filtered and the residue washed with ether. The filtrate is diluted with ether and the organic layer washed with water and sodium bicarbonate solution, dried and evaporated to dryness. Purification of the residue by means of preparative thin layer chromatography on H.F. silica gel with chloroform:methanol (9:1) affords 17α-hydroxy-18-methylprogesterone which may be crystallized from acetone:hexane.

A solution of 4.0 g. of 17α-hydroxy-18-methylprogesterone in 200 ml. of dry tetrahydrofuran is stirred with 20 g. of lithium tri-t-butoxyaluminum hydride at 0° C. for 7 hours and the mixture concentrated to a small volume under vacuum. The residue is extracted with ethyl acetate and the organic layer washed with water and saturated sodium bicarbonate solution, dried and evaporated to dryness. This product in 200 ml. of acetic acid is reacted with 12 g. of lead tetraacetate at 25° C. with stirring for 1.3 hours. About 20 ml. of ethylene glycol is then added to destroy the excess of oxidant and the resulting solution diluted with water and extracted with ethyl acetate. The organic layer is then washed with water and saturated sodium bicarbonate solution dried and evaporated to dryness. The resulting residue is dissolved in hexane:benzene (1:1), adsorbed on alumina and eluted with benzene:ether (19:1) to yield 3β-hydroxy-18-methylandrost-4-en-17-one which may be crystallized from acetone:hexane.

Similarly, by repeating the process of this example using ethylmagnesium chloride or n-propylmagnesium chloride in lieu of methylmagnesium chloride, there is obtained 3β-hydroxy-18-ethyl-androst-4-en-17-one and 3β-hydroxy-18-n-propylandrost-4-en-17-one, respectively.

EXAMPLE 2

A mixture of 1 g. of 3β-hydroxy-18-methylandrost-4-en-17-one in 20 ml. of dioxane, and 1.1 molar equivalents of 2,3-dichloro-5,6-dicyano-1,4-benzoquinone is allowed to stand at room temperature for 3 hours. The solid formed during the reaction is removed by filtration and the filtrate evaporated to dryness. The residue is dissolved in acetone and filtered through 20 g. of alumina to yield 18-methylandrost-4-ene-3,17-dione which may be further purified by recrystallization from acetone:hexane.

Similarly, using 3β-hydroxy-18-ethylandrost-4en-17-one and 3β-hydroxy-18-n-propylandrost-4-en-17-one as the starting material in the foregoing procedure, there are obtained the corresponding 3,17-dione compounds.

EXAMPLE 3

A mixture of 250 mg. of 3β-hydroxy-18-methylandrost-4-en-17-one, 650 mg. of lithium-t-butoxyaluminum hydride and 13 ml. of tetrahydrofuran is stirred at 25° C. for 2 hours. The reaction mixture is then extracted with ether and the combined ether extracts are washed with water, dried and evaporated to dryness to yield 18-methylandrost-4-ene-3β,17β-diol which may be crystallized from acetone:hexane.

In a similar manner, 3β-hydroxy-18-ethylandrost-4-en-17-one and 3β-hydroxy-18-n-propylandrost-4-en-17-one may be converted into the corresponding 3β,17β-diol compound.

EXAMPLE 4

A mixture of 170 mg. of 18-methylandrost-4-ene-3β,17β-diol, 200 mg. of 2,3-dichloro-5,6-dicyano-1,4-benzoquinone, and 5 ml. of anhydrous dioxane is allowed to stand at 25° C. for 2.5 hours and then at 0° C. for 15 hours. The reaction mixture is then diluted with 40 ml. of dichloromethane and adsorbed on 50 g. of alumina. Elution with ether affords 17β-hydroxy-18-methylandrost-4-en-3-one which is purified by preparative thin layer chromatography, on HF silica gel, in chloroform:methanol (30:1) and may be crystallized from acetone:hexane as needles.

Likewise, through the use of the above procedure, the 17β-hydroxy-3-keto derivatives of 18-ethylandrost-4-ene-3β,17β-diol and 18-n-propylandrost-4-ene-3β,17β-diol are obtained.

EXAMPLE 5

A solution of 980 mg. of 3β-hydroxy-18-methylandrost-4-en-17-one in 5 ml. of dichloromethane and 20 ml. of ether is added to a solution of potassium acetylide (from 390 mg. potassium metal) in 100 ml. of liquid ammonia. The resulting mixture is stirred for 6 hours. Then 800 mg. of ammonium chloride is added and the ammonia allowed to evaporate overnight. The residue is extracted with dichloromethane and water and the organic layer is washed with water, dried over sodium sulfate and evaporated to give a substantially pale-yellow solid. This crude product is adsorbed on 100 g. of alumina and elution with benzene:ether (4:1 and 1:1) affords a mixture of 17α-ethynyl-18-methylandrost-4-ene-3β,17β-diol and the unchanged 3β-hydroxy-18-methylandrost-4-en-17-one from which the 17α-ethynyl-3β,17β-diol compound is isolated by crystallization from acetone:hexane.

In a similar manner, 3β-hydroxy-18-ethylandrost-4-en-17-one, and 3β-hydroxy-18-n-propylandrost-4-en-17-one are converted into the corresponding 17α-ethynyl-3β,17β-diol compounds.

Likewise, through the use of other acetylides, e.g. potassium methylacetylide, the corresponding 17α-alkynyl derivatives may be obtained.

EXAMPLE 6

A solution of 5 g. of 3β-hydroxy-18-methylandrost-4-en-17-one in 250 ml. of thiophene-free benzene is treated with 10 molar equivalents of vinylmagnesium bromide in anhydrous ether. The mixture is heated at reflux under anhydrous conditions for 24 hours, cooled, and cautiously treated with excess aqueous ammonium chloride solution. The resulting mixture is then extracted with ethyl acetate, the extracts washed with water, dried over sodium sulfate, and evaporated to dryness furnishing 17α-vinyl-18-methylandrost-4-ene-3β,17β-diol which may be purified by crystallization from methylene chloride:hexane.

By repeating the foregoing procedure using other alkenylmagnesium bromides, e.g. isopropenylmagnesium bromide, 1-propenyl-magnesium bromide, and the like, in lieu of vinylmagnesium bromide, the corresponding 17α-alkenyl derivatives are obtained.

Similarly by using 3β-hydroxy-18-ethylandrost-4-en-17-one or 3β-hydroxy-18-n-propylandrost-4-en-17-one in place of 3β-hydroxy-18-methylandrost-4-en-17-one, the corresponding 17α-alkenyl-3β,17β-diol compounds are obtained.

EXAMPLE 7

To a stirred solution of 2 g. of 3β-hydroxy-18-methylandrost-4-en-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield 17α-ethyl-18-methylandrost-4-ene-3β,17β-diol which may be further purified through recrystallization from acetone:hexane.

EXAMPLE 8

A solution of 5 g. of 3β-hydroxy-18-methylandrost-4-en-17-one in 250 ml. of thiophene-free benzene is treated with an equimolar amount of methylmagnesium bromide in anhydrous ether. The mixture is heated at reflux under anydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 17α,18-dimethylandrost-4-ene-3β,17β-diol which may be recrystallized from methylene chloride:hexane.

EXAMPLE 9

A mixture of 1 g. of 17α-ethynyl-18-methylandrost-4-ene-3β,17β-diol in 20 ml. of dioxane and 1.1 molar equivalents of 2,3-dichloro-5,6-dicyano-1,4-benzoquinone is stirred at 25° C. for 5.5 hours. The reaction mixture is then filtered and the filtrate evaporated to dryness. The residue is dissolved in methylene chloride and filtered through 20 g. of alumina to yield 17α-ethynyl-17β-hydroxy-18-methylandrost-4-en-3-one which may be purified by recrystallization from acetone:hexane.

By repeating the process of this example using as the starting material, the other 3β,17β-diol compounds of the present invention, e.g. 17α-ethynyl-18-ethylandrost-4-ene-3β,17β-diol, 17α-vinyl-18-methylandrost-4-ene-3β,17β-diol, 17α,18-dimethylandrost-4-ene-3β,17β-diol, the corresponding 17β-hydroxy-3-one compounds are obtained, e.g. 17α-ethynyl-17β-hydroxy-18-ethylandrost-4-en-3-one, 17α-vinyl-17β-hydroxy-18-methylandrost-4-en-3-one and 17β-hydroxy-17α,18-dimethylandrost-4-en-3-one.

EXAMPLE 10

A solution of 5 g. of 17α-ethynyl-17β-hydroxy-18-methylandrost-4-en-3-one in 100 ml. of glacial acetic acid containing 5 ml. of ethane dithiol and 4 ml. of a saturated solution of hydrogen chloride in acetic acid, is allowed to stand at room temperature for 4 hours. Water is added and the resulting mixture then extracted with ethyl acetate. The extracts are washed with a 5 percent aqueous sodium bicarbonate solution and water, dried over sodium sulfate and evaporated to dryness. The residue is recrystallized from ether:hexane and 4 g. of this material in 3 liters of ethanol (previously distilled over Raney nickel) is heated at reflux with 50 g. of degassed Raney nickel for 6 hours. The metal is removed by filtration and washed with hot ethanol and the filtrate evaporated to dryness. The residue is dissolved in chloroform and this chloroform solution is washed with dilute hydrochloric acid, sodium carbonate solution and water, dried and evaporated to dryness to yield 3-desoxy-17α-ethynyl-18-methylandrost-4-en-17β-ol.

By subjecting the other 3-keto compounds of the present invention to the process of this example, as for example, 17β-hydroxy-18-methylandrost-4-en-3-one, 17α-vinyl-17β-hydroxy-18-methylandrost-4-en-3-one, 17α-ethyl-17β-hydroxy-18-methylandrost-4-en-3-one, and 17β-hydroxy-17α,18-dimethylandrost-4-en-3-one, etc., there is obtained the corresponding 3-desoxy derivative.

EXAMPLE 11

Two milliliters of dihydropyran are added to a solution of 1 g. of 17α-ethynyl-17β-hydroxy-18-methylandrost-4-en-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 17α-ethynyl-17β-(tetrahydropyran-2'-yloxy)-18-methylandrost-4-en-3-one which is recrystallized from pentane.

By repeating the process of this example using the other 17β-hydroxy-3-one and 17β-hydroxy-3-desoxy compounds of the present invention, the corresponding 17β-tetrahydropyranyl ethers are obtained.

Likewise, by repeating the above process with the exception of using dihydrofuran in lieu of dihydropyran, the corresponding 17β-tetrahydrofuranyl ethers are obtained, e.g. 17α-ethynyl-17β-(tetrahydrofuran-2'-yloxy)-18-methylandrost-4-en-3-one.

EXAMPLE 12

A mixture of 1 g. of 17α-ethynyl-17β-hydroxy-18-methylandrost-4-en-3-one, 1 g. of p-toluenesulfonic acid monohydrate, 50 ml. of acetic acid and 25 ml. of acetic anhydride is allowed to stand at room temperature for 24 hours and is then poured into water and stirred. This mixture is then extracted with methylene chloride and these extracts are dried and evaporated to yield 17α-ethynyl-17β-acetoxy-18-methylandrost-4-en-3-one.

By repeating the process of this example using the other 17β-hydroxy-3-one and 17β-hydroxy-3-desoxy compounds of the present invention, the corresponding 17β-acetoxy compounds are obtained.

Similarly, through the use of other carboxylic acid anhydrides in the process of this example, other 17β-acylates may be obtained.

EXAMPLE 13

One gram of lithium tri-t-butoxyaluminum hydride is added to an ice cooled solution of 1 g. of 17α-ethynyl-17β-acetoxy-18-methylandrost-4-en-3-one in 120 ml. of dry tetrahydrofuran and the mixture is then allowed to stand for 16 hours at room temperature. The excess reagent is decomposed by addition of water and the solution is then concentrated to small volume in vacuo and diluted with water. The product is extracted with ethyl acetate and these extracts are washed with water, dried and evaporated to yield 17α-ethynyl-17β-acetoxy-18-methylandrost-4-en-3β-ol which may be further purified by recrystallization from acetone:hexane.

Similarly, the process of this example may be used to convert other 3-keto compounds of the present invention into the corresponding 3β-hydroxy derivative, e.g. 17α-vinyl-17β-acetoxy-18-methylandrost-4-en-3β-ol, 17α-ethynyl-17β-(tetrahydropyran-2'-yloxy)-18-methylandrost-4-en-3β-ol, etc.

EXAMPLE 14

A mixture of 1 g. of 17α-ethynyl-17β-hydroxy-18-methylandrost-4-en-3-one, 1 g. of p-toluenesulfonic acid monohydrate, 50 ml. of dichloroacetic acid, and 25 ml. of dichloroacetic acid anhydride is allowed to stand at room temperature for 24 hours, and then poured into water and stirred. This mixture is then extracted with methylene chloride and the organic extracts are dried and evaporated to yield 17β-dichloroacetoxy-17α-ethynyl-18-methylandrost-4-en-3-one.

By repeating the process of this example using as the starting material the other 17β-hydroxy-3-one and 17β-hydroxy-3-desoxy compounds of the present invention, there are obtained the corresponding 17β-dichloroacetoxy derivatives.

EXAMPLE 15

A mixture of 2 g. of 17β-hydroxy-17α-ethynyl-18-methylandrost-4-en-3-one in 8 ml. of pyridine and 4 ml. of adamantoyl chloride is heated at steam bath temperatures for 1 hour. The mixture is then poured into ice water and the solid which forms is collected by filtration, washed with water and dried to yield 17β-adamantoyloxy-17α-ethynyl-18-methylandrost-4-en-3-one which is further purified through recrystallization from methylene chloride:hexane.

EXAMPLE 16

A mixture of 1 g. of 17α-ethynyl-17β-hydroxy-18-methylandrost-4-en-3-one, 1 g. of p-toluenesulfonic acid monohydrate, 50 ml. of propionic acid and 25 ml. of propionic acid anhydride is allowed to stand at room temperature for 24 hours and is then poured into water and stirred. This mixture is then extracted with methylene chloride and these extracts are dried and evaporated to yield 17α-ethynyl-17β-hydroxy-18-methylandrost-4-en-3-one-17-propionate.

Likewise, through the use of other 17β-hydroxy-3-one and 17β-hydroxy-3-desoxy compounds of the present invention in the process of this example, the corresponding 17β-propionate is obtained.

EXAMPLE 17

A mixture of 1 g. of 17α-ethynyl-18-methylandrost-4-en-3β,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-17α-ethynyl-18-methylandrost-4-en-17β-ol which may be further purified through recrystallization from acetone:hexane.

By repeating the process of this example using other 3β-hydroxy compounds of the present invention as the starting material, the corresponding 3β-acetoxy compounds are obtained.

EXAMPLE 18

A mixture of 1 g. of 17α-ethynyl-18-methylandrost-4-ene-3β,17β-diol, 1 g. of p-toluenesulfonic acid monohydrate, 50 ml. of acetic acid and 25 ml. of acetic anhydride is allowed to stand at room temperature for 24 hours and then poured into water and stirred. This mixture is then extracted with methylene chloride and these extracts are dried and evaporated to yield 3β,17β-diacetoxy-17α-ethynyl-18-methylandrost-4-ene which is recrystallized from acetone:ether.

Similarly, the other 3β,17β-diol compounds of the present invention are transformed into the corresponding 3β,17β-diacetoxy compounds.

EXAMPLE 19

Five milliliters of dihydropyran are added to a solution of 1 g. of 17β-ethynyl-18-methylandrost-4-ene-3β,17β-diol in 20 ml. of benzene. About 1 ml. is removed by distillation to remove moisture and 0.6 g. of p-toluenesulfonic acid is added to the cooled solution. This mixture is allowed to stand at room temperature for 4 days, and is then washed with aqueous sodium bicarbonate solution and water, dried and evaporated. The residue is chromatographed on neutral alumina, eluting with hexane, to yield 3β,17β-bis (tetrahydropyran-2'-yloxy)-17α-ethynyl-18-methylandrost-4-ene.

Similarly, using dihydrofuran in place of dihydropyran in the foregoing procedure, there is obtained the corresponding 3β,17β-bis tetrahydrofuranyl ether.

EXAMPLE 20

Two milliliters of dihydropyran are added to a solution of 1 g. of 17α-ethynyl-17β-acetoxy-18-methylandrost-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3β-(tetrahydropyran-2'-yloxy)-17α-ethynyl-17β-acetoxy-18-methylandrost-4-ene which is recrystallized from pentane.

The corresponding tetrahydrofuranyl ether is obtained by using dihydrofuran in place of dihydropyran in the above process.

What is claimed is:

1. A compound of the formula:

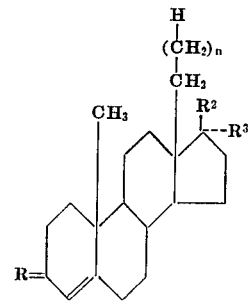

wherein n is a positive integer of from one to three; R is oxo or the group

in which $R^4$ is hydrogen, hydroxy or a carboxylic acyloxy group containing less than 12 carbon atoms; $R^2$ is selected from the group consisting of hydroxy and a carboxylic acyloxy group containing less than 12 carbon atoms; $R^3$ is selected from the group consisting of hydrogen, lower alkyl, lower alkenyl, and lower alkynyl; and $R^2$ and $R^3$ taken together is oxo.

2. A compound according to claim 1 wherein R is oxo.

3. A compound according to claim 2 wherein $R^2$ is hydroxy and $R^3$ is ethynyl.

4. A compound according to claim 2 wherein $R^2$ is hydroxy and $R^3$ is vinyl.

5. A compound according to claim 2 wherein $R^2$ is hydroxy and $R^3$ is methyl.

6. A compound according to claim 1 wherein $R^2$ and $R^3$ taken together is oxo and R is the group

in which $R^4$ is hydroxy.

7. A compound according to claim 2 wherein $R^2$ is hydroxy or acetoxy, $R^3$ is ethynyl and n is 1.

8. A compound according to claim 2 wherein $R^2$ is acetoxy and $R^3$ is ethynyl.

9. A compound according to claim 2 wherein $R^2$ is hydroxy and $R^3$ is hydrogen.

10. A compound according to claim 2 wherein $R^2$ is hydroxy or acetoxy, $R^3$ is hydrogen and n is 1.

11. Compounds having the structure:

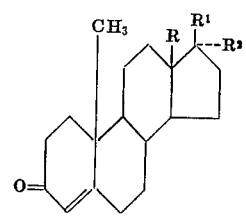

wherein R is a lower polycarbonalkyl group; $R^1$ is selected from the group consisting of hydroxy and a lower carboxylic acyloxy group; $R^2$ is selected from the group consisting of hydrogen, lower alkyl and lower alkynyl; and $R^1$ and $R^2$ taken together is oxo.

* * * * *